Patented Mar. 4, 1930

1,749,244

UNITED STATES PATENT OFFICE

MARCUS J. FESSLER, OF SYRACUSE, NEW YORK

METHOD OF TREATING COMMERCIAL GASOLINE FOR INTERNAL-COMBUSTION ENGINES TO REMOVE AND PREVENT THE FORMATION OF CARBON

No Drawing. Application filed December 24, 1925. Serial No. 77,590.

This invention relates to a method of treating commercial gasoline as a fuel for internal combustion engines to prevent the formation of carbon.

It is well-known, that the combustion of this commercial gasoline leaves more or less carbon deposit on the walls of the combustion chamber including the piston and valves due to imperfect or premature combustion.

This accumulation of carbon solidifies in a coating of greater or less thickness which, aside from its tendency to incandescence or excessive heat-retention under continued operation of the engine, is a direct cause of motor troubles such as reduced power and consequent carbon knocks and waste of fuel.

The main object of the present invention is to treat the gasoline in such manner that it will effectively remove previously formed carbon and prevent the formation of new carbon and at the same time will increase the combustibility of the fuel mixture by retarding the explosion sufficiently to allow complete combustion without in any way altering or adding to the present motor equipment.

In other words, I have sought to introduce into the commercial gasoline a relatively small percentage of some other agent which is readily miscible with the gasoline and which, when introduced with the combustible fuel mixture into cylinders of the engine, will not only disintegrate and remove any previously formed carbon but will also prevent the formation of new carbon as a result of the combustion without in any way injuring any of the parts through which or into which the mixture is introduced in transit from the source of supply to the exhaust.

After many and repeated experiments I have discovered that a relatively small quantity of hydro-hydrocarbons produced by direct or indirect hydrogenation of the hydrocarbons of the carbocyclic series is instantly miscible with a relatively large quantity of gasoline and that this mixture not only increases the combustibility of the fuel for the reasons stated but also attacks, disintegrates and removes any previously formed carbon and prevents the formation of new carbon thereby reducing to a minimum the liability of what is commonly known as carbon knocks, which means greater smoothness of operation, more power, greater speed and more mileage per gallon, and also reduces the fuel consumption.

In these experiments I have found that approximately one ounce of tetra-hydronaphthalene of the hydrogenated carbocyclic series to five gallons of commercial gasoline or approximately two-tenths (.2) parts of tetrahydronaphthalene to approximately one hundred (100) parts of gasoline is highly efficient in carrying out the objects of the invention, and that these proportions may be varied according to the gravity of the gasoline without reducing the efficiency of the combustible mixture.

In practicing this invention the tetra-hydronaphthalene or its equivalent of the hydrogenated carbocyclic series is simply introduced into the gasoline in the main supply tank with which the motor vehicles are usually equipped at normal atmospheric temperature and without further treatment of the mixture after said introduction to act as an agent in preventing the formation of carbon.

This preventative agent when introduced into the gasoline in about the proportions named instantly mixes with the gasoline, which acts as a conveyer therefor so that the liquid mixture may readily be drawn into the combustion chambers of the engine in the usual manner for ignition and combustion and the conversion of the combustion into power, during which the relatively small quantity of hydrogenated carbocyclic compound attacks, disintegrates and removes any carbon which may have been previously formed and increases the combustion of the mixture to such an extent as to prevent the precipitation of additional carbon upon the walls of the combustion chamber and other parts of the engine exposed thereto.

What I claim is:

1. The herein described method of treating commercial gasoline for internal combustion engines to remove and prevent the formation of carbon consisting in introducing a relatively small percentage by weight of tetrahydronaphthalene of the hydrogenated carbocyclic series into a relatively large quantity by weight of commercial gasoline at normal atmospheric temperatures and without any alteration of the gasoline previous to the introduction of the tetrahydronaphthalene.

2. The herein described method of treating commercial gasoline for internal combustion engines to remove and prevent the formation of carbon consisting in introducing a modifying agent consisting only of approximately two-tenths parts of tetrahydronaphthalene into approximately one-hundred parts of commercial gasoline at normal atmospheric temperatures and without any alteration of the gasoline previous to the introduction of the tetrahydronaphthalene.

3. The herein described method of treating commercial gasoline for internal combustion engines to remove and prevent the formation of carbon consisting in introducing a modifying agent consisting only of approximately .2 parts of tetrahydronaphthalene into approximately 100 parts of gasoline.

4. A composition for the prevention and removal of carbon deposits in internal combustion engines consisting of gasoline and approximately .2 of 1% of tetrahydronaphthalene.

In witness whereof I have hereunto set my hand this 16th day of December 1925.

MARCUS J. FESSLER.